(12) United States Patent
Venkatasubramanian et al.

(10) Patent No.: US 12,451,169 B2
(45) Date of Patent: Oct. 21, 2025

(54) MEMORY DEVICE INCLUDING VOLTAGE AND TEMPERATURE SENSING CIRCUIT AND METHOD FOR MANAGING OPERATION THEREOF

(71) Applicant: Samsung Electronics Co., Ltd., Suwon-si (KR)

(72) Inventors: Poornima Venkatasubramanian, Bengaluru (IN); Gopi Sunanth Kumar Gogineni, Bengaluru (IN); Puneet Suri, Bengaluru (IN); Lava Kumar Pulluru, Bengaluru (IN); Karthikeyan Somashekara, Bengaluru (IN); Manish Chandra Joshi, Bengaluru (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 232 days.

(21) Appl. No.: 18/375,805

(22) Filed: Oct. 2, 2023

(65) Prior Publication Data
US 2024/0321324 A1    Sep. 26, 2024

(30) Foreign Application Priority Data

Mar. 24, 2023  (IN) .............................. 202341021246
Aug. 4, 2023   (IN) .............................. 202341021246

(51) Int. Cl.
*G11C 7/04*   (2006.01)
*G11C 5/14*   (2006.01)
(Continued)

(52) U.S. Cl.
CPC ................ *G11C 7/04* (2013.01); *G11C 5/143* (2013.01); *G11C 7/12* (2013.01); *G11C 7/14* (2013.01);
(Continued)

(58) Field of Classification Search
CPC .. G11C 7/04; G11C 7/14; G11C 7/222; G11C 5/143; G11C 7/12; G11C 7/227; G11C 8/16; G11C 11/417; G11C 11/419
See application file for complete search history.

(56) References Cited

U.S. PATENT DOCUMENTS 7,646,658 B2   1/2010   Chen et al.
7,746,716 B2   6/2010   Jetton et al.
(Continued)

*Primary Examiner* — Joshua L Schwartz
*Assistant Examiner* — Joseph Fidelis Stormes
(74) *Attorney, Agent, or Firm* — Muir Patent Law, PLLC

(57) ABSTRACT

A memory device, includes a voltage and temperature sensing circuit configured to generate a Pull Down (PD) signal that varies based on upon at least one of a voltage and temperature at the memory device; and primary pull down paths provided with secondary pull down paths, wherein the primary pull down paths are provided separately at a Dummy Read Bit line (DRBL) and a Dummy Global Read Bit line (DGRBL), wherein the secondary pull down paths are provided separately for the DRBL and the DGRBL parallel to the respective primary pull down paths. The voltage and temperature sensing circuit is configured to perform at least one of: controlling at least one of the secondary pull down paths based on a voltage of the PD signal; varying a discharge time of at least one of the dummy bit-lines based on the voltage of the PD signal; and generating an early reset signal at one of a high temperature condition and a high voltage condition based on the voltage of the PD signal.

20 Claims, 19 Drawing Sheets

(51) Int. Cl.
  *G11C 7/12* (2006.01)
  *G11C 7/14* (2006.01)
  *G11C 7/22* (2006.01)
  *G11C 8/16* (2006.01)
  *G11C 11/417* (2006.01)
  *G11C 11/419* (2006.01)

(52) U.S. Cl.
  CPC .............. *G11C 7/222* (2013.01); *G11C 7/227* (2013.01); *G11C 8/16* (2013.01); *G11C 11/417* (2013.01); *G11C 11/419* (2013.01)

(56) References Cited

U.S. PATENT DOCUMENTS

| | | | |
|---|---|---|---|
| 9,858,217 B1 | 1/2018 | Marfatia et al. | |
| 11,017,848 B2 | 5/2021 | Jain et al. | |
| 2006/0067144 A1* | 3/2006 | Liu | G11C 8/16 365/203 |
| 2009/0316464 A1* | 12/2009 | Sharma | G11C 7/12 365/94 |
| 2022/0165321 A1* | 5/2022 | Seo | G11C 7/1066 |

\* cited by examiner

200a

MEMORY DEVICE INCLUDING VOLTAGE AND TEMPERATURE SENSING CIRCUIT AND METHOD FOR MANAGING OPERATION THEREOF

CROSS-REFERENCE TO RELATED APPLICATION(S)

This application claims priority to Indian Patent Application Nos.: 202341021246(CS), filed Aug. 4, 2023, and 202341021246(PS), filed Mar. 24, 2023, the entire contents of each of which are incorporated by reference herein.

TECHNICAL FIELD

The present disclosure relates to the field of memory device operation managing methods, and more particularly relates to a memory device comprising a voltage and temperature sensing circuit and methods for managing operations of the memory device comprising the voltage and temperature sensing circuit.

BACKGROUND

Currently, as transistor size is reduced in advanced technology nodes, a leakage current through a transistor included in a memory device is increasing exponentially. Also, variations in bitcell leakage in memory devices due to process variations and temperature have increased. As an example, in a single ended Static random-access memory (SRAM) with a dedicated read port in the bit-cells, increased variation in the leakage current causes degradation in a read 1 margin (e.g., a read "1" operation is when a "1" is being read by the SRAM). Therefore, there is a desire to employ techniques or methods to improve robustness of the read 1 operation.

In existing methods and circuits, in order to improve the read operation in the memory device (e.g., SRAM or the like), a delay tuning circuit may be used in the memory device.

The delay tuning circuit includes a process sensing circuit provided in a tracking circuit of the memory device. The process sensing circuit includes an input clock configured to generate a clock input based on an internal clock, a voltage node configured to generate a voltage based on the clock input, and a diode connected to the voltage node. The voltage generated by the voltage node is proportional to a threshold voltage of the diode, wherein the threshold voltage of the diode is based on a process state of the diode. A contention P-type Metal Oxide Semiconductor (PMOS) creates a delay in a reset time of the internal clock according to the voltage generated at the voltage node of the diode.

But, the delay tuning circuit increases the pulse-width and power consumption in the memory device. It affects the performance of the memory device. This type of arrangement helps to sense the device process and improve read margin in dual sensing memories by increasing word-line pulse-width at a worst read corner. But in single ended memories, this arrangement further harms read 1 margins and hence is not suitable.

FIG. 1a depicts an example conventional Static Random-Access Memory (SRAM) bitcell device (an example of a memory device) with a single ended read path. Transistors (M1 to M6) are write port transistors of a bitcell and are controlled by a write wordline (WWL). The write wordline (WWL) is activated and goes high during write operation and data present in bitlines (BLT/BLC) gets written into the bitcell. Transistors (M7/M8) are used for read operation and are coupled to the read wordline (RWL).

FIG. 1b illustrates a circuit diagram of a read port circuit for single ended SRAM (100). As shown in FIG. 1b, a read port of a bitcell comprises an M7 NMOS transistor and an M8 NMOS transistor. Read port devices are used to pull down a read bitline (RBL) which is connect 0065d to all the bitcells of a bank. During default state RBL is pre-charged to VDD using the PCH signal.

In general, the RWL is 0 during standby mode and becomes 1 in the selected row during a read operation. The PCH is 0 during standby mode and 1 during read operation. Consider, Q=1 and Qb=0, Read wordline (RWL)=1, Bitline precharge (PCH)=1 in the circuit (100) then, M7 is ON and M8 is OFF and pre-charge is cut off. Further, due to leakage to a VSS through the M7 NMOS transistor and the M8 NMOS transistor in every row of a bank, a Read Bit line (RBL) can discharge below a trigger point of a sensing NAND gate (106). When the RBL discharges below the trigger point of NAND, this leads to a false read 0 operation (e.g., a read "0" operation is when a "0" is being read by the SRAM). Further, a discharge duration is determined by a pulse width of the RWL/PCH. Hence, a dip is observed in the RBL due to leakage during a read 1 operation. Further, an input voltage at which output of the NAND gate (106) flips, so that the value of the read 1 margin corresponds to a NAND DIP subtracted from a NAND FLIP voltage. In general, the RBL is pre-charged to VDD at the end of every read operation and remains pre-charged at VDD during standby mode. As explained above, the NAND DIP voltage heavily depends on leakage of M7 NMOS transistor and M8 NMOS transistor.

During a read 0 operation, consider Q-0 and Qb-1, RWL-1, PCH-1⇒RBL discharges to 0 and causes the NAND gate output 1 to discharge Global Read Bitline (GRBL) to 0. For example, during the read 0 operation, MOS (M7) and MOS (M8) are ON and discharge RBL from the initial state of VDD to 0. During read 0, the RBL discharges to 0 and during read 1, the RBL is undriven.

Table 1 indicates the read margins at different voltage and temperature with respect to FIG. 1b.

TABLE 1

| Voltage | Temperature | Read 0 | Read 1 |
| --- | --- | --- | --- |
| Low | Low | Bad | Good |
| Low | High | optimum | Bad |
| High | Low | Good | Good |
| High | High | Good | Bad |

The read margin characteristics at different conditions calls for the need for temperature and voltage based assist techniques to improve read 1 characteristics while preserving the read 0 margin.

In single ended SRAM (100), a self-timed internal clock (ICK) controls trigger points and pulse width of critical signals like word lines, pre-charge enable, column selects, etc. The GRBL is latched and output of the latch is DOUT. A latch clock generator takes ICK as input and generates a latch clock which makes the latch transparent only during read operation.

FIG. 2a illustrates a schematic diagram (200a) depicting the connection between FIG. 1b and FIG. 2b using logic. The logic receives an input as a self-timed internal clock (ICK) and provides the output as RWL and PCH.

FIG. 2b illustrates a circuit diagram (200b) of a self-timed internal clock (ICK) generation in the single ended SRAM (100). The pull up circuit (202) will make ICK 1 as soon as external clock rises, and the pull down circuit (204) pulls down (or resets) the ICK to 0.

As shown in FIG. 2b, the ICK first edge is triggered by an external clock (CK) rise. The pulse width of the ICK is determined by a self-timing circuit (206) (as shown in FIG. 3) to optimize cycle time depending on the number of rows and columns in a memory array. The ICK rise triggers the self-timing circuit (206), so that the self-timing circuit (206) mimics an actual read/write circuit using model circuits. The self-timing circuit (206) is tuned to mimic a delay of an actual read/write circuit. A reset signal for the ICK is generated to get optimum pulse widths for critical signals to complete the operation. An output of the self-timing circuit (206) is a reset signal which enables a pull down at the ICK to discharge it to 0.

FIG. 3 illustrates a circuit diagram of the self-timing circuit (206) for self-timed internal clock (ICK) generation in the single ended SRAM (100). Specifically, FIG. 3 shows a portion of the self-timing circuit (206) where the ICK rise triggers a dummy read word line. For example, the ICK may connected through a logic circuit to the dummy WL, such that the ICK signal appears at the input of the NMOS M1. A "dummy" line as discussed herein refers to a line either not connected to a memory cell or connected to a memory cell whose state is not used for memory access purposes. The NMOS M1 mimics a read port transistor in the bitcell to discharge a dummy RBL to 0 as dummy WL becomes 1. Similar to the actual circuit, the dummy RBL (DRBL) is a metal that is routed across decoders to mimic a capacitance of RBL. The dummy RBL discharge is sensed through a NAND gate and turns on M2 (mimicking M0) to discharge Dummy GRBL metal travelling to all banks. Discharge of Dummy GRBL is sensed to generate reset to enable ICK pull down. Based on the numbers of rows per bank and number of banks, discharge time for DRBL and DGRBL can be different and hence pulse width may need to be optimized for every memory configuration.

It is desired to address the above mentioned disadvantages or other short comings or at least provide a useful alternative.

SUMMARY

Some of the embodiments herein disclose a memory device comprising a voltage and temperature sensing circuit for generating a Pull Down (PD) signal that depends on at least one of a voltage and temperature at the memory device.

Some embodiments herein provide methods for managing an operation of the memory device including the voltage and temperature sensing circuit.

Some embodiments herein improve a read 1 margin by controlling world line pulse width based on an operating temperature of the voltage and temperature sensing circuit. Also, a method can be used to improve a read 1 margin without any deterioration in a read 0 margin. The method can be used to achieve optimal performance in a single ended SRAM in a robust manner.

According to an example embodiment, a memory device, includes a voltage and temperature sensing circuit configured to generate a Pull Down (PD) signal that varies based on upon at least one of a voltage and temperature at the memory device; and primary pull down paths provided with secondary pull down paths, wherein the primary pull down paths are provided separately at a Dummy Read Bit line (DRBL) and a Dummy Global Read Bit line (DGRBL), wherein the secondary pull down paths are provided separately for the DRBL and the DGRBL parallel to the respective primary pull down paths. The voltage and temperature sensing circuit is configured to perform at least one of: controlling at least one of the secondary pull down paths based on a voltage of the PD signal; varying a discharge time of at least one of the dummy bit-lines based on the voltage of the PD signal; and generating an early reset signal at one of a high temperature condition and a high voltage condition based on the voltage of the PD signal.

According to an example embodiment, a method for managing an operation of a memory device includes generating a Pull Down (PD) signal, using a voltage and temperature sensing circuit, which varies based on at least one of a voltage and temperature at the memory device; and providing a primary pull down path with a secondary pull down path. The primary pull down path is provided separately at a dummy Read Bit line (DRBL) and a Dummy Global Read Bit line (DGRBL), the secondary pull down path is provided separately for the DRBL and the DGRBL parallel to the respective primary pull down path, and the voltage and temperature sensing circuit is configured to perform at least one of: controlling the secondary pull down paths based on a voltage of the PD signal, varying a discharge time of at least one of the dummy bit-lines based on the voltage of the PD signal; and generating an early reset signal at one of a high temperature condition and a high voltage condition based on the voltage of the PD signal.

According to an example embodiment, a method for managing an operation of a memory device includes providing a voltage and temperature sensing circuit that generates a Pull Down (PD) signal that varies based on at least one of voltage and temperature; providing a temperature and voltage controlled pass gate between dummy bit-lines and a primary pull down path to alter an effective load connected as a function of voltage and temperature; and activating or deactivating the temperature and voltage controlled pass gate and altering the effective load connected to the primary pull down path based on values of one of the voltage and the temperature.

BRIEF DESCRIPTION OF FIGURES

Embodiments herein are illustrated in the accompanying drawings, throughout which like reference letters indicate corresponding parts in the various figures. The embodiments herein will be better understood from the following description with reference to the drawings, in which.

DETAILED DESCRIPTION

Figure 1A:
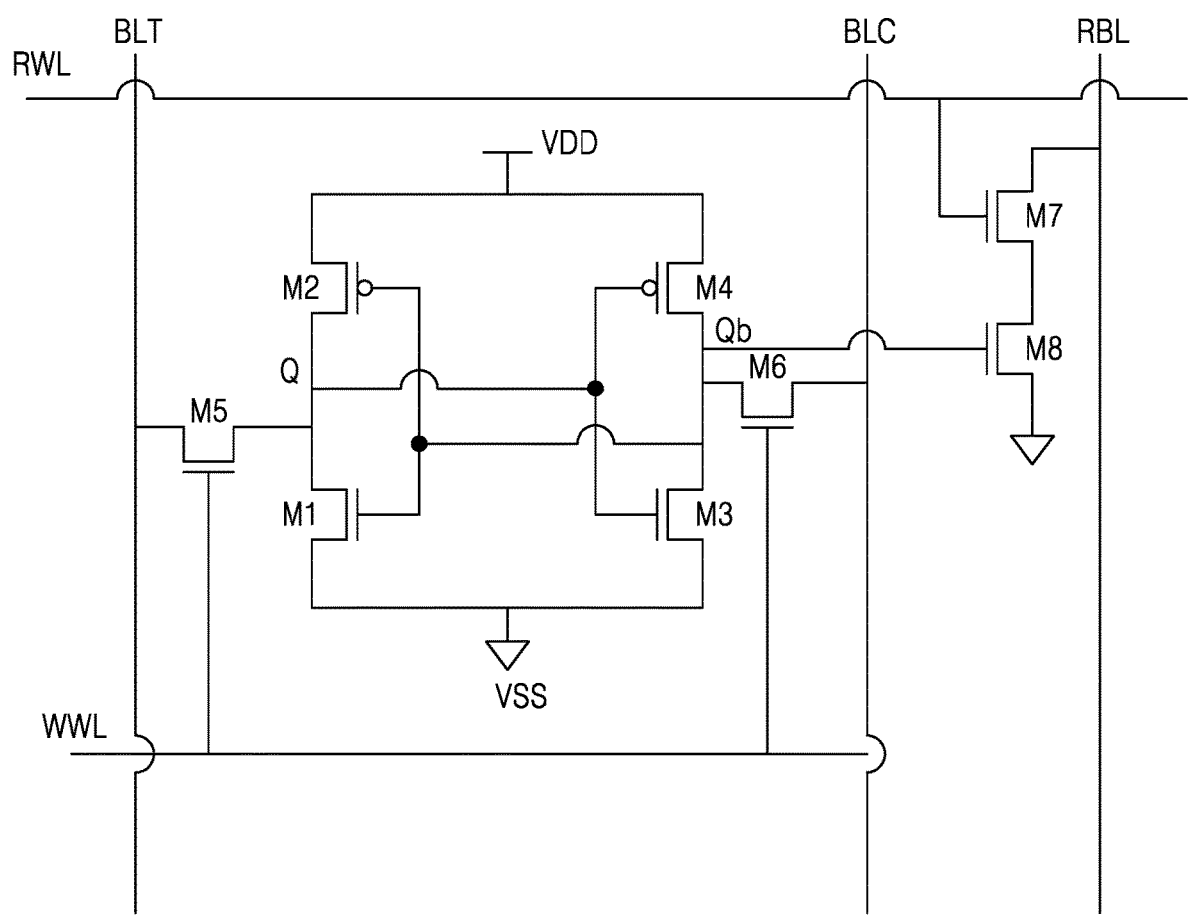
FIG. 1a depicts an example conventional Static Random-Access Memory (SRAM) bitcell device (an example of a memory device) with a single ended read path.
Figure 1B:
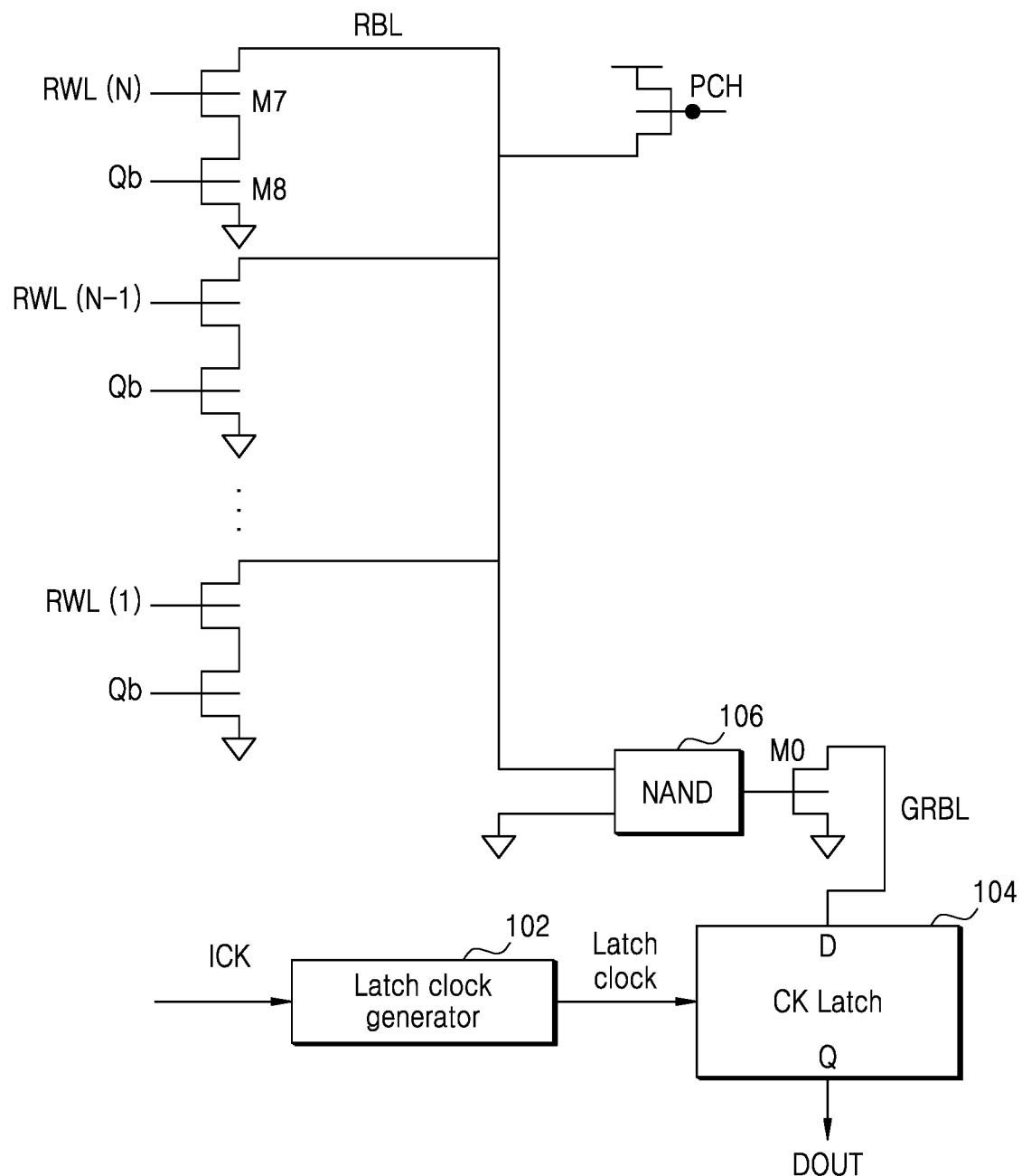
FIG. 1b illustrates a circuit diagram of a read port circuitry for single ended SRAM.
Figure 2A:
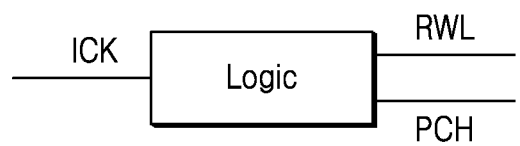
FIG. 2a illustrates a schematic diagram depicting the connection between FIG. 1b and FIG. 2b using a logic circuit.
Figure 2B:
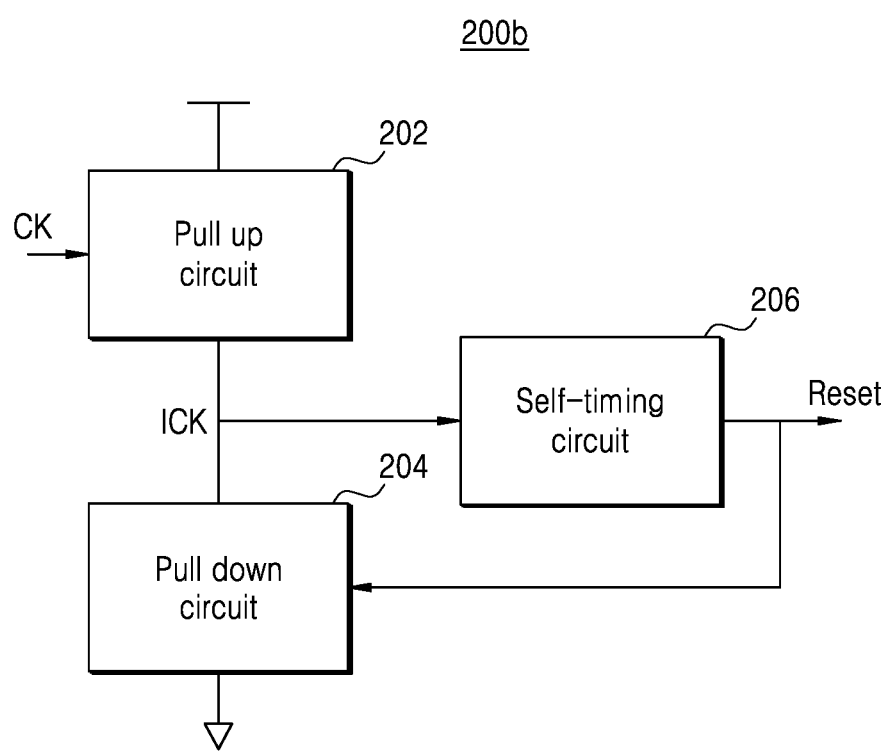
FIG. 2b illustrates a circuit diagram of a self-timed internal clock (ICK) generation in the single ended SRAM.

The example embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The description herein is intended merely to facilitate an understanding of ways in which the example embodiments herein can be practiced and to further enable those of skill in the art to practice the example embodiments herein. Accordingly, this disclosure should not be construed as limiting the scope of the example embodiments herein.

Embodiments herein achieve a memory device comprising a voltage and temperature sensing circuit generating a Pull Down (PD) signal upon detecting at least one of a voltage and temperature at the memory device. Though described at times herein as a voltage and temperature "sensing" circuit, the circuit does not necessarily "sense" or "detect" a voltage or temperature-rather it is sensitive or responsive to voltage and temperature in that it may cause a different output to occur with changes in input voltage or changes in temperature. A primary pull down path is provided with a secondary pull down path. The primary pull down paths are provided separately at DRBL and DGRBL. The secondary pull down paths are also provided separately for the DRBL and the DGRBL parallel to the respective primary pull down paths. The voltage and temperature sensing circuit is configured to perform at least one of controlling the secondary pull down path based on a voltage of the PD signal, varying a discharge time of the dummy bit-line based on the voltage of the PD signal, and generating an early reset signal at one of a high temperature condition and a high voltage condition based on the voltage of the PD signal.

Unlike conventional methods and systems, the proposed method improves a read 1 margin by controlling world line pulse width based on an operating temperature of the circuit. The method can be used to improve read 1 margins without any deterioration in read 0 margins. The method can be used to achieve optimal performance in a single ended SRAM in a robust manner.

Referring now to the drawings, and more particularly to FIGS. 4 through 17, where similar reference characters denote corresponding features consistently throughout the figures, there are shown example embodiments.

Figure 4:
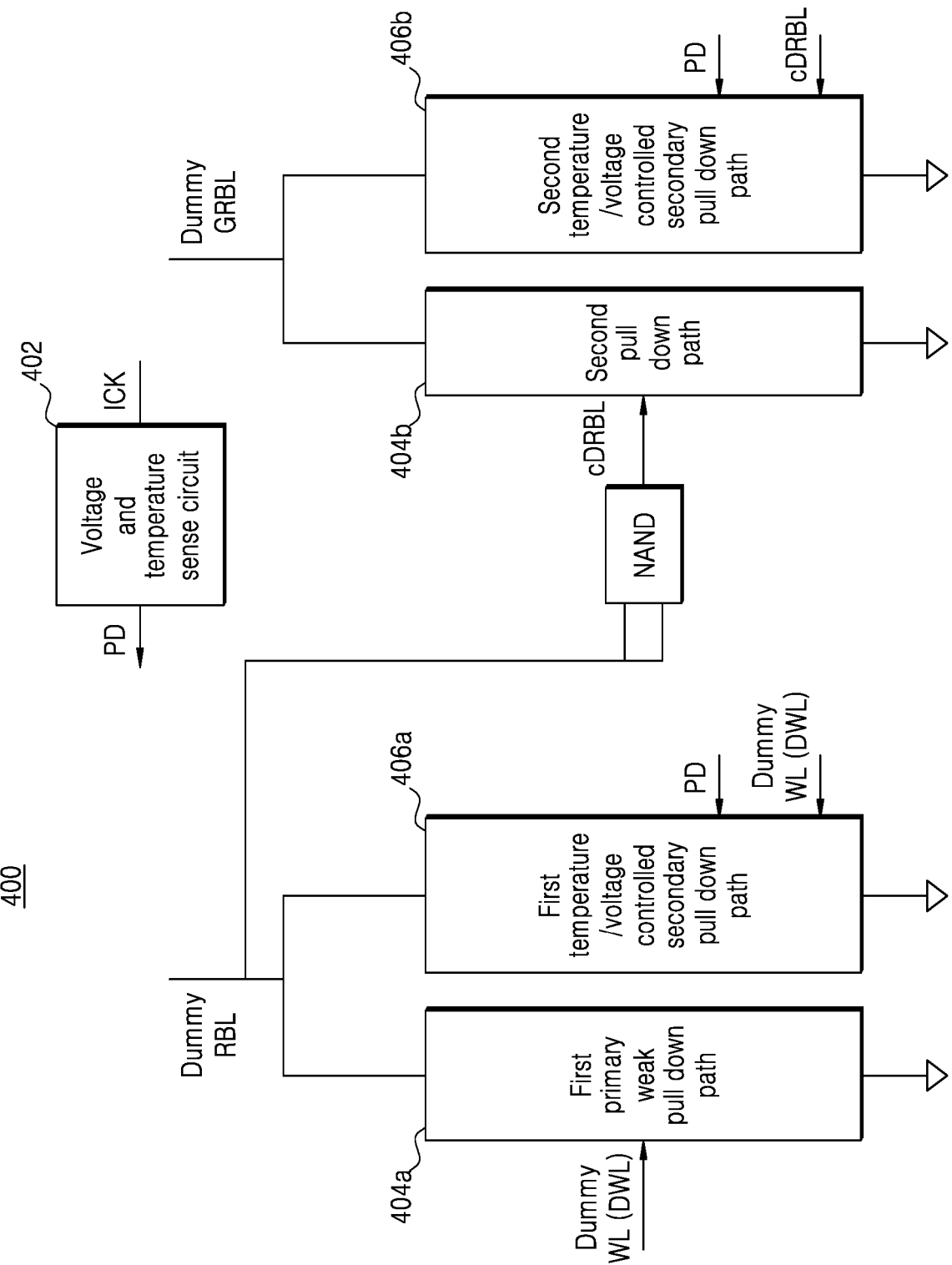
FIG. 4 illustrates a block diagram of a self-timing circuit for self-timed internal clock (ICK) generation in the single ended SRAM, according to an embodiment as disclosed herein.
Figure 5:
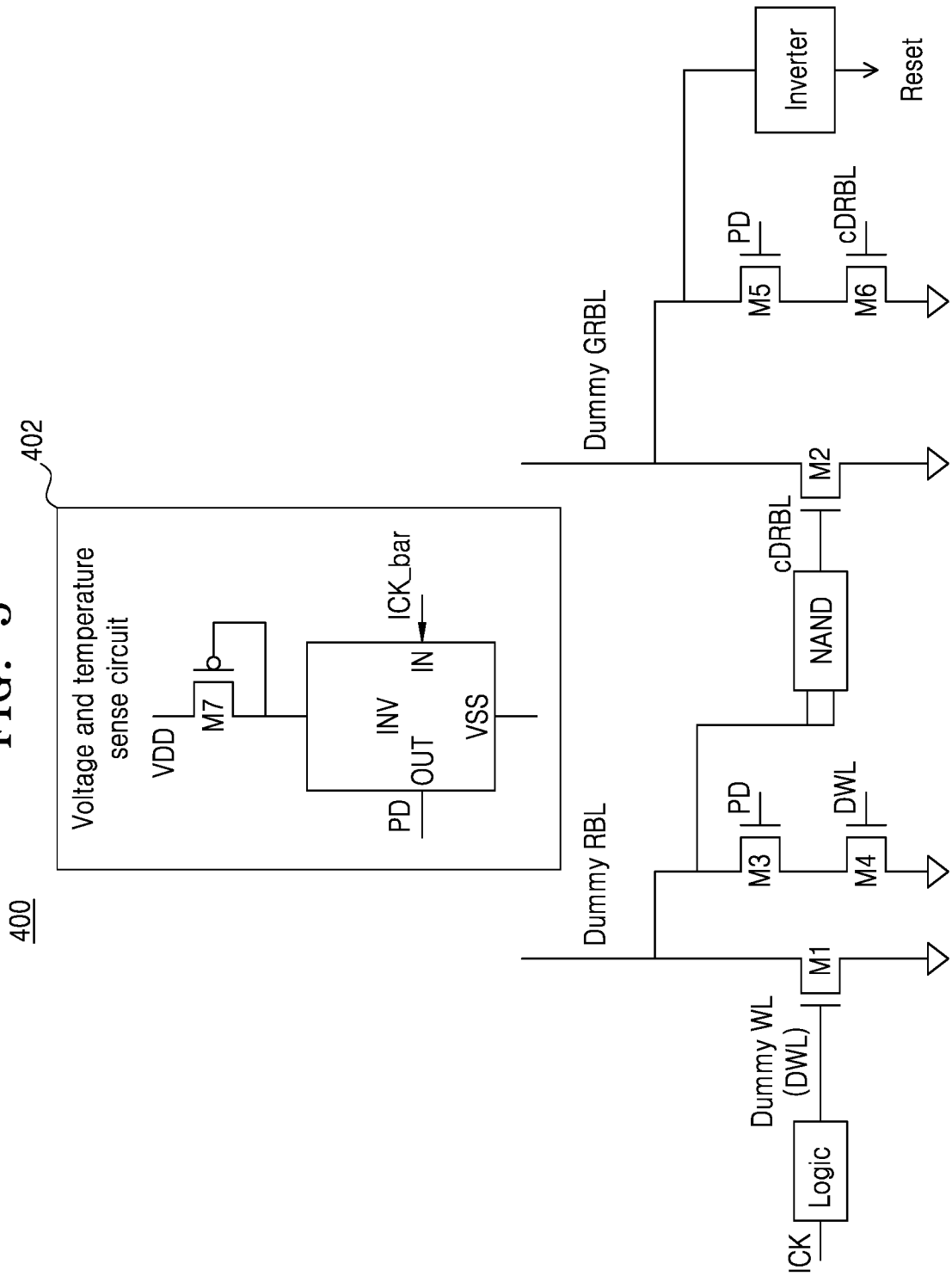
FIG. 5 is a circuit diagram of the self-timing circuit for self-timed internal clock (ICK) generation in the single ended SRAM, according to an embodiment as disclosed herein.
Figure 6:
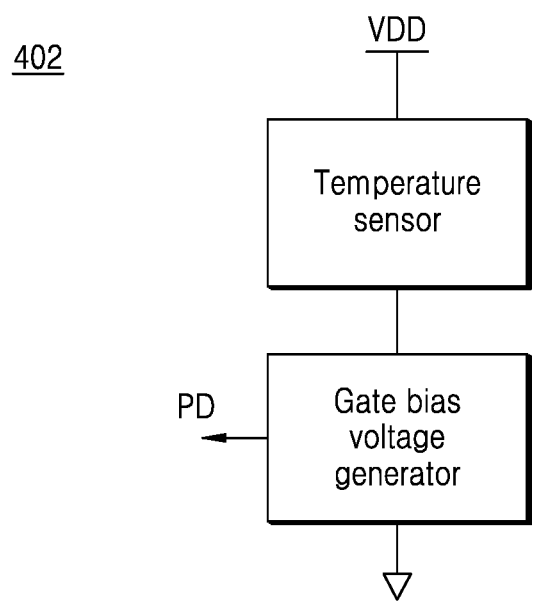
FIG. 6 illustrates a schematic diagram of a voltage and temperature sense circuit included in the self-timing circuit, according to an embodiment as disclosed herein.

FIG. 4 illustrates a block diagram of the self-timing circuit (400) for self-timed internal clock (ICK) generation in the single ended SRAM (100), according to an embodiment as disclosed herein. FIG. 5 is a circuit diagram of the self-timing circuit (400) for self-timed internal clock (ICK) generation in the single ended SRAM (100), according to an embodiment as disclosed herein. The self-timing circuit (400) can also be implemented in a register file, a read-only memory (ROM), or another on-chip memory device.

As shown in FIG. 4 and FIG. 5, a voltage and temperature sensing circuit (402), a first primary pull down path (404a) (i.e., first primary weak pull down path), a first secondary pull down path (406a) (i.e., first temperature/voltage controlled secondary pull down path), a second primary pull down path (404b) (i.e., second primary weak pull down path), and a second secondary pull down path (406b) (i.e., second temperature/voltage controlled secondary pull down path) are provided. Various examples and implementations of the voltage and temperature sense circuit (402) are depicted in FIG. 7A to FIG. 7G.

Figure 3:
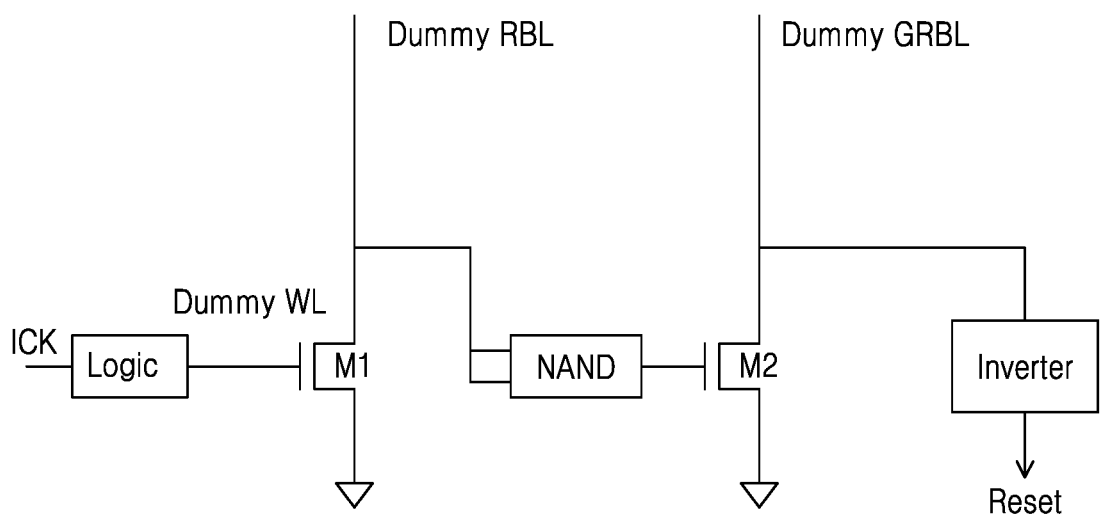
FIG. 3 illustrates a circuit diagram of a self-timing circuit for self-timed internal clock (ICK) generation in the single ended SRAM.

The voltage and temperature sensing circuit (402) generates a Pull Down (PD) signal upon detecting at least one of a voltage and temperature at the memory device (e.g., single ended SRAM (100), a register file or the like). The primary pull down path (404a) is provided with the secondary pull down path (406a). The primary pull down paths are provided separately at the DRBL and the DGRBL. The primary pull down path at the DRBL refers to the MOS device (M1) of FIG. 3 and the primary pull down path at the DGRBL refers to the MOS device (M2) of FIG. 3. The secondary pull down paths are also provided separately for the DRBL and the DGRBL parallel to the respective primary pull down paths. The voltage and temperature sensing circuit (402) is configured to perform at least one of controlling the secondary pull down path (406a) based on a voltage of the PD signal, varying a discharge time of the dummy bit-line based on the voltage of the PD signal, and generating an early reset signal at one of a high temperature condition and a high voltage condition based on the voltage of the PD signal.

In an embodiment, the dummy bit-line is associated with the primary pull down path (404a) and the secondary pull down path (406a) used for discharge and generation of the early reset signal to control the ICK pulse width (PW). The primary pull down path (404a) at a DRBL comprises one or more NMOS series transistors controlled by Dummy WL (DWL), where the secondary pull down path (406a) at the DBL comprises two or more NMOS transistors with DWL and PD as control. The second primary pull down path (404b) at the DGRBL comprises one or more NMOS transistors with complement of DRBL (cDRBL) as control. The second secondary pull down path (406b) at the DGRBL comprises two or more NMOS transistors in series with cDRBL and PD as control.

Further, the voltage and temperature sensing circuit (402) is configured to assist in generating the early reset signal so as to reduce internal clock and WL pulse-width at one of the high temperature condition and the high voltage condition to improve a read 1 margin and performance of the memory device. Further, a pulse width is preserved to maintain a read 0 margin in the memory device during one of a low voltage condition and a low temperature condition.

The secondary pull down path (406a) is controlled by activating the secondary pull down path (406a) or varying strength of the secondary pull down path (406a), or deactivating the secondary pull down path (406a). In an embodiment, the activation, the deactivation, and the strength of the secondary pull down path (406a or 406b) is dependent on the voltage level of the PD signal. In an embodiment, the secondary pull down path (406a or 406b) is deactivated or weakly activated upon occurrence of a low voltage condition and a low temperature condition as reflected in the PD signal. In another embodiment, the secondary pull down path (406a or 406b) is activated and strongly active upon the occurrence of a low voltage condition and a high temperature condition as reflected in the PD signal. For example, the secondary pull down path (406a or 406b) may be activated at the high temperature and the secondary pull down becomes stronger as voltage at the memory increases. In an embodiment, the secondary pull down path (406a or 406b) is activated and strongly active upon the occurrence of a high voltage condition as reflected in the PD signal. For example, the secondary pull down may be activated at high voltage and secondary pull down becomes stronger and may also be activated with increase in temperature (e.g., even at lower voltages). The high temperature may refer to a temperature above a typical temperature, and the high voltage may refer to a voltage more than a typical voltage at a given node. Typical temperature may refer to converging temperature when circuit operation is stable. In another embodiment, the secondary pull down path is controlled by a combination of a dummy WL, a PD for Dummy RBL and a combination of a complement of dummy read bitline (cDRBL) and the PD for dummy GRBL. A stronger or weaker active level of a path refers to a voltage drop and/or current across the path. For example, a stronger active level refers to a lower voltage drop and/or higher current, while a weak active level refers to a higher voltage drop and/or lower current.

An example of the above discussion can be summarized as follows, with the voltage and temperature sensing circuit (402) operating in the following way:
a) Low voltage, low temperature—Secondary pull down is disabled or weakly active,
b) Low Voltage, high temperature—Secondary pull down is active and strong, and
c) High Voltage—Secondary pull down is active and strength varies with temperature Thus, depending on the voltage and temperature conditions, discharge times of dummy bit-lines vary. The circuit helps in generating an early reset signal at the high temperatures or the high voltage conditions to improve read 1 margins and performance. At low voltage and low temperature conditions pulse width is preserved to maintain read 0 margins.

FIG. 5 shows the addition of the secondary pull down to DRBL/DGRBL whose current is controlled by the temperature. During read operation, the ICK=1, cICK/ICK_bar=0, PD=VDD−Vtp of M7, wherein VDD is a positive voltage that can have a higher or lower value, and Vtp is a voltage drop between the source and drain of transistor M7.

At DRBL, DWL=1 so M1 and M4 are ON. M3:G (e.g., gate voltage of M3)=VDD−Vtp.
a) At low voltage, low temperature, Vtp is high so VDD−Vtp is close to Vtn of M3 (e.g., the threshold voltage for turning on transistor M3). M3 is OFF or passes very little current,
b) At low voltage, high temperature, Vtp is LOW so VDD−Vtp>Vtn of M3. M3 is fully on and secondary pull down is active, and
c) At high voltage, VDD−Vtp>Vtn of M3, so secondary path (e.g., secondary pull-down) is active At DUMMY GRBL, DRBL=0 so cDRBL=1. M2 and M6 are on.
a) M5 is controlled by PD (=VDD−Vtp)
b) At low temperature, M6 is off but at higher temperature M6 is on and secondary pull down is enabled at low voltage
c) At high voltage, secondary pull down is always enabled Stacking with DWL_FB/cDRBL pull down ensures that the secondary pull down path is active only during read operations.

Figure 7A:
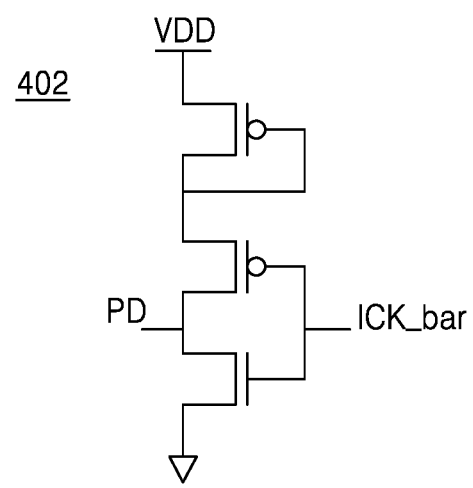
FIG. 7A to FIG. 7G are circuit diagrams of a voltage and temperature sense circuit included in the self-timing circuit, according to an embodiment as disclosed herein.
Figure 7B:
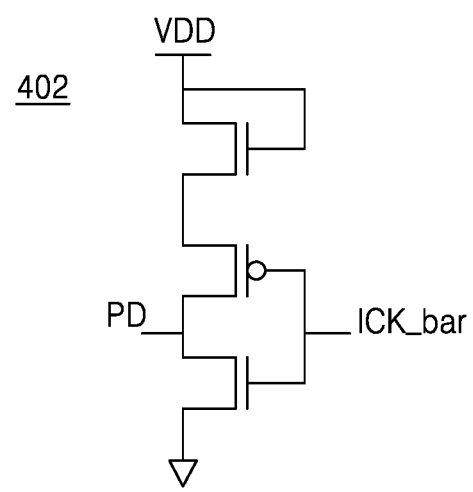

As shown in FIG. 7A, an implementation of voltage and temperature sensing circuit (402) can be done using a PMOS diode connected between VDD and a supply source of an inverter. The threshold voltage of a diode connected device is inversely proportional to temperature. As an alternative, as shown in FIG. 7B, the voltage and temperature sensing circuit (402) can be used to control the pull down path using a NMOS diode. During the read operation, PD is equal to VDD−VTn of the NMOS diode (M1). As Vtn is a function of temperature, the PD value changes with the temperature.

Figure 7C:
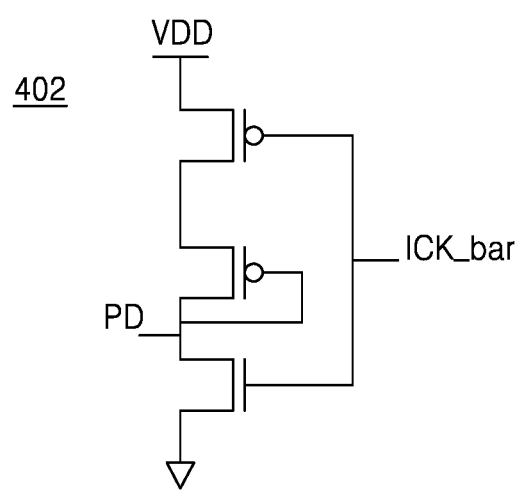

As shown in FIG. 7C, the voltage and temperature sensing circuit (402) can be used to control the pull down path using a diode with placement changed. During the read operation, PD is equal to VDD−VTp of the PMOS diode (M2). As Vtp is a function of temperature, the PD value changes with temperature.

Figure 7D:
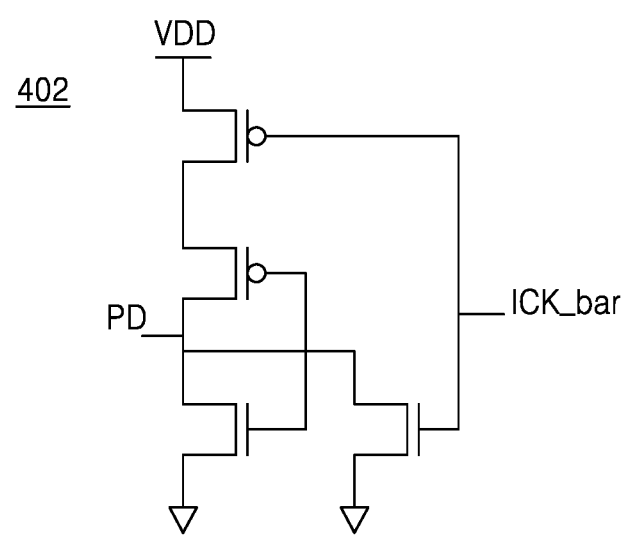

As shown in FIG. 7D, the voltage and temperature sensing circuit (402) can be used to control the pull down path using both PMOS and NMOS diodes at pull down and pull up paths. During read operation, PD is equal to VDD−ΔV, where ΔV is a function of Vtp of the PMOS diode (M3) and Vtn of the NMOS diode (M4). As Vtn and Vtp are the functions of temperature, the PD value changes with the temperature.

Figure 7E:
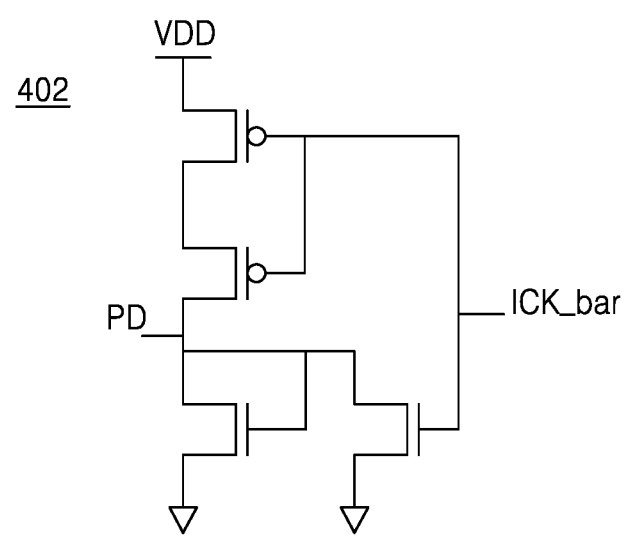

As shown in FIG. 7E, the voltage and temperature sensing circuit (402) can be used to control the pull down path using a diode at the pull down path instead of pull up path and having stack PMOS. In this case, PD is equal to VDD−$\Delta V_2$, where $\Delta V_2$ is a function of Vtn of NMOS diode (M5). As Vtn is a function of temperature, the PD value changes with the temperature.

Figure 7F:
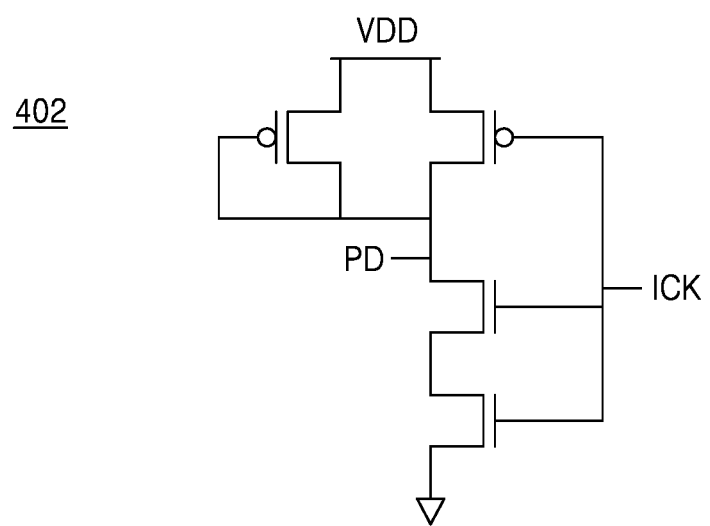

As shown in FIG. 7F, the voltage and temperature sensing circuit (402) can be used to control the pull down path using a diode parallel to the inverter with a complement input. In this case, the PD is a function of Vtp of the PMOS diode (M6). As Vtp is the function of temperature, the PD value changes with the temperature.

Figure 7G:
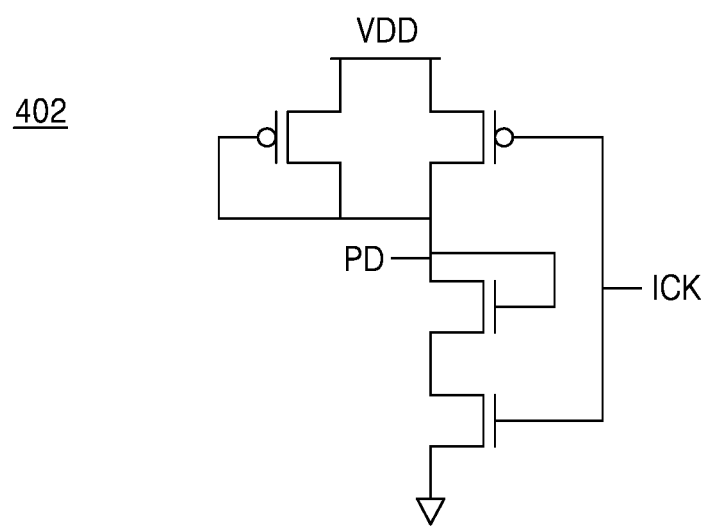

As shown in FIG. 7G, the voltage and temperature sensing circuit (402) can be used to control the pull down path using a diode at pull up path and the pull down path. In this case, PD is a function of Vtp of PMOS (M8) and Vtn of NMOS diode (M7). As Vtn and Vtp are a function of temperature, the PD value changes with the temperature. In summary, the circuits shown in FIGS. 7a-7g depict different arrangements for causing temperature or voltage (e.g., VDD) changes to cause a different output voltage for the PD node. For example, the nature of the circuits in FIGS. 7A-7G, due to changes in their operation due to changes in VDD or changes in temperature (both of which may cause voltage changes in other nodes of the circuit that cause variation in those voltages compared to a typical voltage when temperature is stable and a predetermined voltage (e.g., typical VDD) occurs), results in different outputs at the PD node. This output voltage for the PD node can be used, as discussed above, to control a strength of a secondary pull down path connected to a dummy bit line (e.g., dummy RBL or dummy GRBL). Similar or substantially similar implementations of the voltage and temperature sensing circuit may be used for controlling the pull down path.

Figure 8:
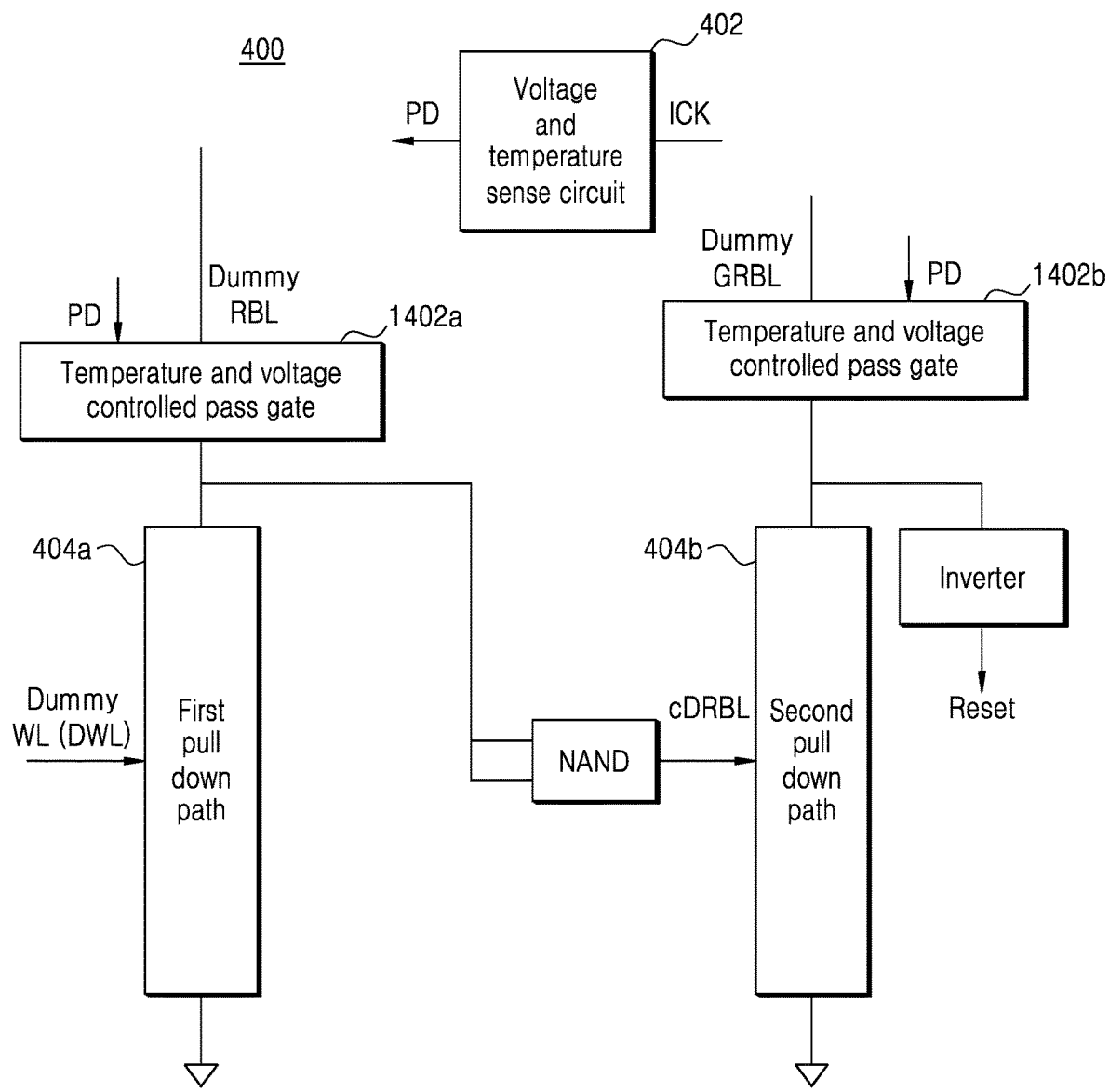
FIG. 8 illustrates another block diagram of the self-timing circuit for self-timed internal clock (ICK) generation in the single ended SRAM, according to an embodiment as disclosed herein.

FIG. 8 illustrates another block diagram of the self-timing circuit for self-timed internal clock (ICK) generation in the single ended SRAM, according to an embodiment as disclosed herein. The temperature and voltage controlled passgate (1402a or 1402b) is added between the dummy bitline and the pull down path (404a or 404b) to alter the load on the pull down as a function of voltage and temperature. The added passgate (1402a or 1402b) will be enabled or disabled or weakly enabled based on the voltage on the PD signal. The voltage and temperature sensing circuit (402) is configured to perform at least one of controlling the temperature and voltage controlled pass gate (1402a or 1402b) based on the voltage of the PD signal, varying a discharge time of the dummy bit-line based on the voltage of the PD signal, and generating an early reset signal at one of a high temperature condition and a high voltage condition based on the voltage of the PD signal. In an embodiment the control of the temperature and voltage controlled pass gate (1402a or 1402b) comprises one of: activating the pass gate to increase effect load seen by the pull down (404a or 404b), deactivating the pass gate to reduce the effective load seen by the pull down (404a or 404b) and varying the effective load seen by the pull down (404a or 404b). At low voltage and low temperature, the PD value is low and the passgate (1402a or 1402b) turns ON. The pull down structure sees more load and hence takes more time to discharge. This results in more pulsewidth and is good for read 0 operation. At low voltage and high temperature or at high voltage, the PD value is more and pass gate (1402a or 1402b) turns OFF or is weakly active. This reduces the load on the pull down structure and an early reset is generated to reduce the pulsewidth of ICK to help in the read 1 operations and performance.

In an embodiment, the voltage and temperature sensing circuit (402) is configured to assist in generating the early reset signal so as to reduce internal clock and RWL pulsewidth at one of the high temperature condition and the high voltage condition to improve a read 1 margin and performance of the memory device. In an embodiment, a pulse width is preserved to maintain the read 0 margin in the memory device during one of the low voltage condition and the low temperature condition.

In an embodiment, the temperature and voltage controlled pass gate (1402a or 1402b) are activated upon the occurrence of the low voltage condition and the low temperature condition as reflected in the PD signal, wherein the pass gate (1402a or 1402b) are deactivated upon the occurrence of the low voltage condition and the high temperature condition as reflected in the PD signal, and wherein the pass gate (1402a or 1402b) are deactivated upon the occurrence of the high voltage condition as reflected in the PD signal.

Figure 9:
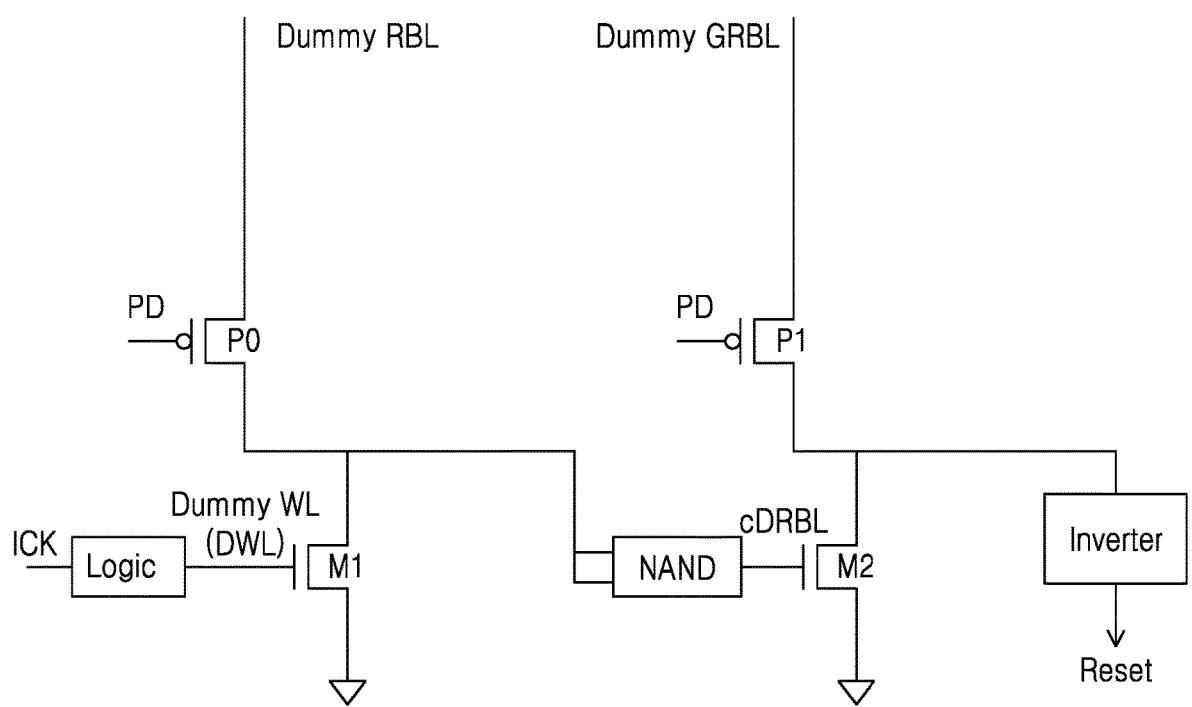
FIG. 9 is another circuit diagram of the self-timing circuit for self-timed internal clock (ICK) generation in the single ended SRAM, according to an embodiment as disclosed herein.

FIG. 9 is a circuit diagram of the self-timing circuit for self-timed internal clock (ICK) generation in the single ended SRAM, according to an embodiment as disclosed herein. Consider, during read operation, ICK=1, DWL=1, PD=VDD-Vtp. In an embodiment, in the DRBL, at low voltage and low temperature, Vtp is high, VDD-Vtp is small, P0 is ON and pull down sees more load and takes more time to discharge resulting in more pulsewidth for the read 0 operation. In another embodiment, in the DRBL, at low voltage and high temperature, Vtp is low, VDD-Vtp is higher, P0 is cut OFF and effective load on pull down reduces to generate early reset faster to have lesser pulsewidth for a read 1 operation. In an embodiment, in the DRBL, at high voltage, VDD-VTp is high, P0 is off or partially ON and load is cut off from pull down making discharge faster and pulsewidth of ICK lesser.

In an embodiment, consider, during read operation, ICK=1, DWL=1, PD=VDD-Vtp. In the DGRBL, at low voltage and low temperature, Vtp is high, VDD-Vtp is small, P1 is ON and pull down sees more load and takes more time to discharge resulting in more pulsewidth for a read0 operation. In an embodiment, in the DGRBL, at low voltage, high temperature, Vtp is low, VDD-Vtp is higher, P1 is cut off and effective load on pull down reduces to generate early reset faster to have lesser pulsewidth for read 1. In an embodiment, in the DGRBL, at high voltage, VDD-VTp is high, P1 is OFF or partially ON and load is cut off from pull down making discharge faster and pulsewidth of ICK lesser.

Figure 10:
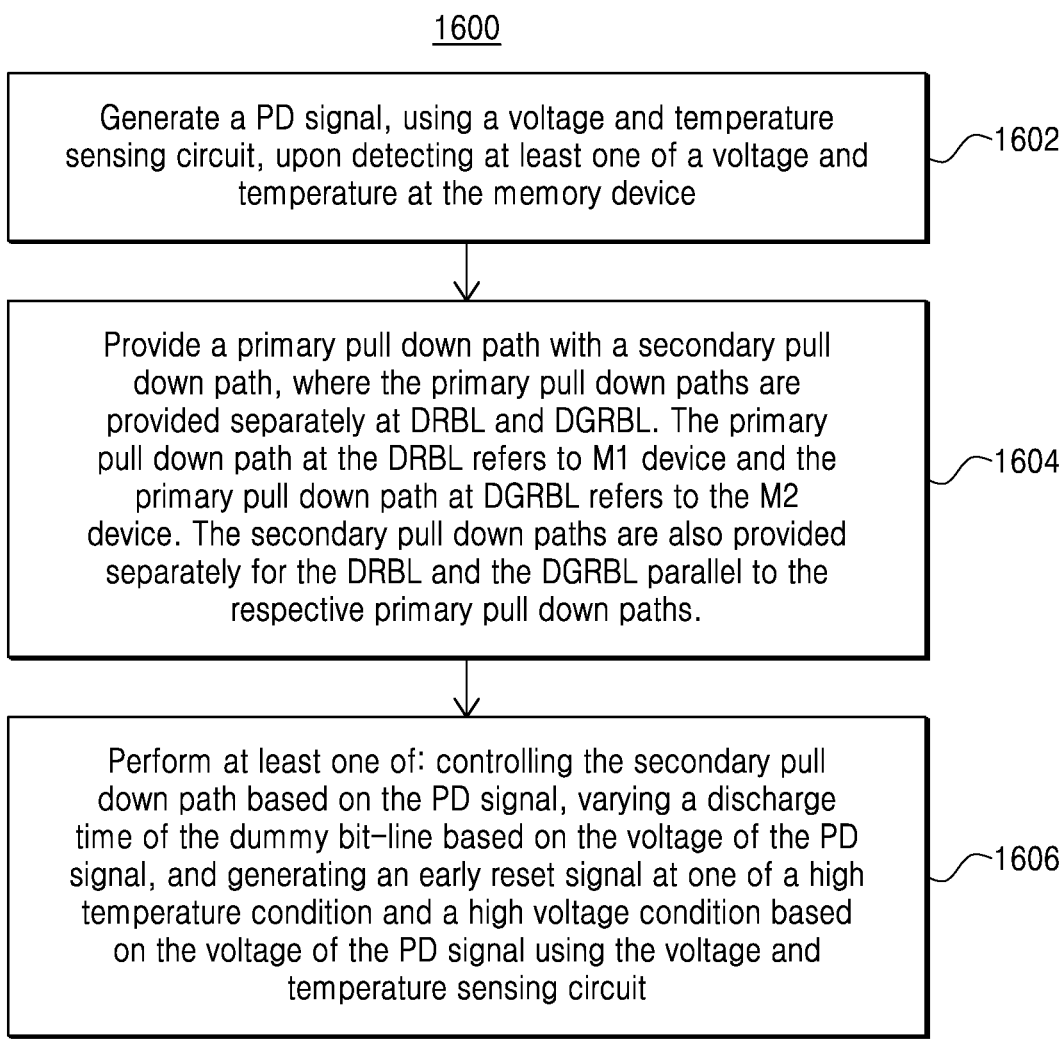
FIG. 10 is a flow chart illustrating a method for managing an operation of the memory device, according to an embodiment as disclosed herein.

FIG. 10 is a flow chart (1600) illustrating a method for managing an operation of the memory device, according to an embodiment as disclosed herein. At 1602, the method includes generating the PD signal, using the voltage and temperature sensing circuit (402), wherein the PD signal varies based on at least one of a voltage and temperature at the memory device (100). At 1604, the method includes providing the primary pull down path (404a or 404b) with the secondary pull down path (406a or 406b). The primary pull down paths are provided separately at the DRBL and the DGRBL. The secondary pull down paths are also provided separately for the DRBL and the DGRBL parallel to the respective primary pull down paths. At 1606, the voltage and temperature sensing circuit (402) is configured to perform at least one of controlling the secondary pull down path (406a or 406b) based on the voltage of the PD signal, varying the discharge time of the dummy bit-line based on the voltage of the PD signal, and generating an early reset signal at one of a high temperature condition and a high voltage condition based on the voltage of the PD signal.

The proposed method improves a read 1 margin by controlling world line pulse width based on an operating temperature of the circuit. The method can be used to improve read 1 margins without any deterioration in read 0 margins. The method can be used to achieve optimal performance in the single ended SRAM (100).

Figure 11:
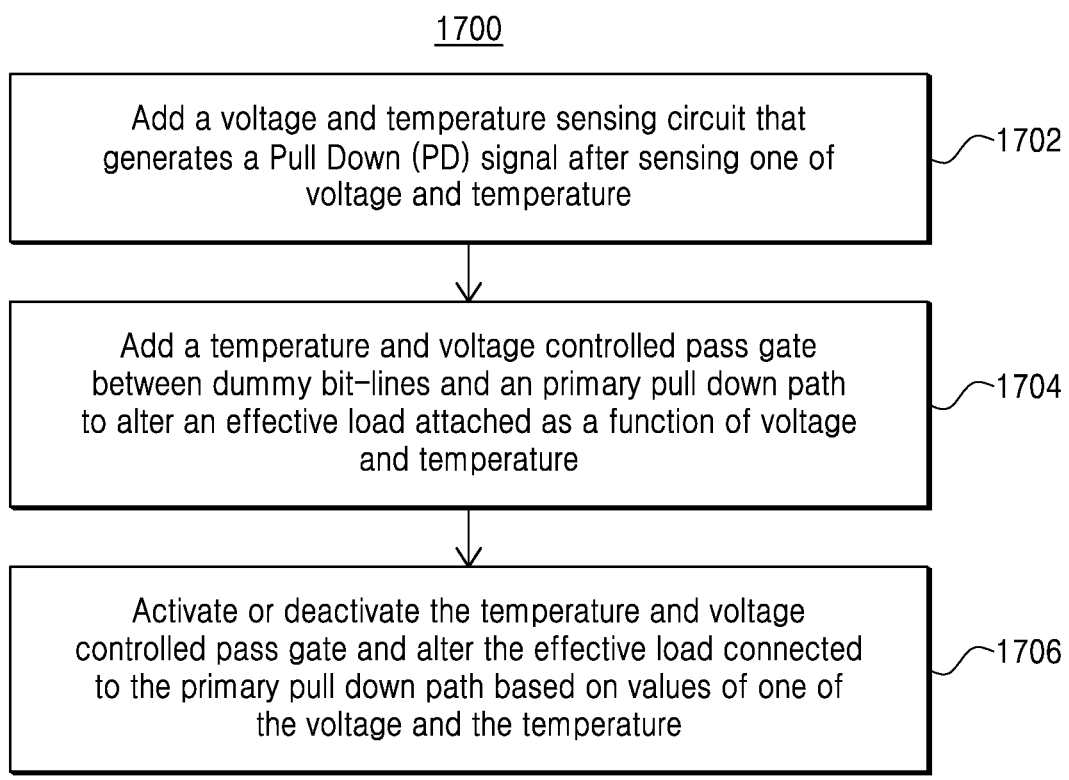
FIG. 11 is another flow chart illustrating a method for managing the operation of the memory device, according to an embodiment as disclosed herein.

FIG. 11 is another flow chart (1700) illustrating a method for managing the operation of the memory device, according to an embodiment as disclosed herein.

At 1702, the method includes adding the voltage and temperature sensing circuit (402) that generates the PD signal after sensing one of voltage and temperature. At 1704, the method includes adding the temperature and voltage controlled pass gate (1402a or 1402b) between the dummy bit-lines and the primary pull down path (404a or 404b) to alter the effective load attached as a function of voltage and temperature. At 1706, the method includes activating or deactivating the temperature and voltage controlled pass gate (1402a or 1402b) and altering the effective load attached to the primary pull down path (404a or 404b) based on values of one of the voltage and the temperature.

The method can be used for improving the read 1 margin in on-chip memories with single ended read operation by varying the discharge time of dummy bitline.

The various actions, acts, blocks, steps, or the like in the flow charts (1600 and 1700) may be performed in the order presented, in a different order or simultaneously. Further, in some embodiments, some of the actions, acts, blocks, steps, or the like may be omitted, added, modified, skipped, or the like without departing from the scope of the invention.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments, those skilled in the art will recognize that the embodiments herein can be practiced with modification within the spirit and scope of the embodiments as described herein.

We claim:

1. A memory device, comprising:
a voltage and temperature sensing circuit configured to generate a Pull Down (PD) signal that varies based on upon at least one of a voltage and temperature at the memory device; and
primary pull down paths provided with secondary pull down paths, wherein the primary pull down paths are provided separately at a Dummy Read Bit line (DRBL) and a Dummy Global Read Bit line (DGRBL), wherein the secondary pull down paths are provided separately for the DRBL and the DGRBL parallel to the respective primary pull down paths,
wherein the voltage and temperature sensing circuit is configured to perform at least one of:
controlling at least one of the secondary pull down paths based on a voltage of the PD signal;
varying a discharge time of at least one of the dummy bit-lines based on the voltage of the PD signal; and
generating an early reset signal at one of a high temperature condition and a high voltage condition based on the voltage of the PD signal.

2. The memory device as claimed in claim 1, wherein the dummy bit-lines are associated with the primary pull down paths and the secondary pull down paths, which are used for discharge and generation of an early reset signal to control an internal clock pulse width;
wherein the primary pull down path at a DRBL comprises a pull down structure controlled by a dummy WL (DWL), wherein the secondary pull down path at the DRBL comprises a pull down structure with DWL and PD as control;
wherein a second primary pull down path at the DGRBL comprises a pull down structure controlled by complement of DRBL (cDRBL) as control, and
wherein a second secondary pull down path at the DGRBL comprises a pull down structure controlled by cDRBL and PD.

3. The memory device as claimed in claim 1, wherein the voltage and temperature sensing circuit is configured to assist in generating the early reset signal so as to reduce internal clock and RWL pulse-width at one of a high temperature condition and a high voltage condition.

4. The memory device as claimed in claim 1, wherein a pulse width is preserved to maintain a read 0 margin in the memory device during one of a low voltage condition and a low temperature condition.

5. The memory device as claimed in claim 1, wherein the secondary pull down paths are controlled by a combination of a dummy WL, a PD for a dummy RBL and a combination of a complement of a dummy read bitline and the PD for a dummy GRBL.

6. The memory device as claimed in claim 1, wherein the memory device comprises one of a single ended static random-access memory (SRAM), a read-only memory (ROM), and a register file.

7. The memory device as claimed in claim 1, wherein control of the secondary pull down paths comprises one of: activating the secondary pull down paths, deactivating the secondary pull down paths, and changing a variable strength of the secondary pull down paths.

8. The memory device as claimed in claim 7, wherein the secondary pull down paths are deactivated or weakly activated upon the occurrence of a low voltage condition and a low temperature condition as reflected in the PD signal.

9. The memory device as claimed in claim 7, wherein the secondary pull down paths are activated and strongly active upon the occurrence of a low voltage condition and a high temperature condition as reflected in the PD signal.

10. The memory device as claimed in claim 7, wherein the secondary pull down paths are activated and strongly active upon the occurrence of a high voltage condition as reflected in the PD signal.

11. A method for managing an operation of a memory device, comprising:
generating a Pull Down (PD) signal using a voltage and temperature sensing circuit, which signal varies based on at least one of a voltage and temperature at the memory device; and
providing a primary pull down path with a secondary pull down path, wherein the primary pull down path is provided separately at a dummy Read Bit line (DRBL) and a Dummy Global Read Bit line (DGRBL), wherein the secondary pull down path is provided separately for the DRBL and the DGRBL parallel to the respective primary pull down path, wherein the voltage and temperature sensing circuit is configured to perform at least one of:
controlling the secondary pull down paths based on a voltage of the PD signal,
varying a discharge time of at least one of the dummy bit-lines based on the voltage of the PD signal; and
generating an early reset signal at one of a high temperature condition and a high voltage condition based on the voltage of the PD signal.

12. The method as claimed in claim 11, wherein the dummy bit-lines are associated with the primary pull down paths and the secondary pull down paths used for discharge and generation of reset signal to control an internal clock pulse width;
wherein the primary pull down path at a DRBL comprises a pull down structure controlled by a dummy WL (DWL), wherein the secondary pull down path at the DRBL comprises a pull down structure with DWL and PD as control;
wherein a second primary pull down path at the DGRBL comprises of a pull down structure controlled by complement of DRBL (cDRBL) as control, and
wherein a secondary pull down path at the DGRBL comprises a pull down structure controlled by cDRBL and PD as control.

13. The method as claimed in claim 11, wherein the voltage and temperature sensing circuit is configured to assist in generating the early reset signal so as to reduce internal clock and RWL pulse-width at one of the high temperature condition and the high voltage condition.

14. The method as claimed in claim 11, wherein a pulse width is preserved to maintain a read 0 margin in the memory device during one of a low voltage condition and a low temperature condition.

15. The method as claimed in claim 11, wherein the secondary pull down paths are controlled by a combination of a dummy WL, a PD for dummy RBL and a combination of a complement of dummy read bitline (cDRBL) and the PD for dummy GRBL.

16. The method as claimed in claim 11 wherein controlling the secondary pull down paths comprises one of: activating the secondary pull down paths, deactivating the secondary pull down paths and changing the varying strength of the secondary pull down paths.

17. The method as claimed in claim 16, wherein the secondary pull down paths are deactivated or weakly activated upon occurrence of a low voltage condition and a low temperature condition as reflected in the PD signal, wherein the secondary pull down paths are activated and strongly active upon occurrence of a low voltage condition and a high temperature condition as reflected in the PD signal, and wherein the secondary pull down paths are activated and strongly active upon occurrence of a high voltage condition as reflected in the PD signal.

18. A method for managing an operation of a memory device, comprising:
providing a voltage and temperature sensing circuit that generates a Pull Down (PD) signal that varies based on at least one of voltage and temperature;
providing a temperature and voltage controlled pass gate between dummy bit-lines and a primary pull down path to alter an effective load connected as a function of voltage and temperature; and
activating or deactivating the temperature and voltage controlled pass gate and altering the effective load connected to the primary pull down path based on values of one of the voltage and the temperature.

19. The method as claimed in claim 18, wherein the voltage and temperature sensing circuit is configured to assist in generating an early reset signal so as to reduce internal clock and read wordline RWL pulse-width at one of a high temperature condition and a high voltage condition.

20. The method as claimed in claim 18, wherein a pulse width is preserved to maintain a read 0 margin in the memory device during one of a low voltage condition and a low temperature condition.

* * * * *